(12) United States Patent
Herud

(10) Patent No.: US 9,839,964 B2
(45) Date of Patent: Dec. 12, 2017

(54) EXPANSION CHUCK

(71) Applicant: Kennametal Inc., Latrobe, PA (US)

(72) Inventor: Josef K. Herud, Herzogenaurach (DE)

(73) Assignee: KENNAMETAL INC., Latrobe, PA (US)

( * ) Notice: Subject to any disclaimer, the term of this patent is extended or adjusted under 35 U.S.C. 154(b) by 142 days.

(21) Appl. No.: 14/739,537

(22) Filed: Jun. 15, 2015

(65) Prior Publication Data

US 2015/0360296 A1    Dec. 17, 2015

(30) Foreign Application Priority Data

Jun. 17, 2014    (DE) .................. 10 2014 108 539

(51) Int. Cl.
*B23B 31/30* (2006.01)

(52) U.S. Cl.
CPC ....... *B23B 31/305* (2013.01); *Y10T 279/1216* (2015.01); *Y10T 279/1241* (2015.01); *Y10T 279/1283* (2015.01)

(58) Field of Classification Search
CPC ............. B23B 31/305; Y10T 279/1216; Y10T 279/1241; Y10T 279/1283
See application file for complete search history.

(56) References Cited

U.S. PATENT DOCUMENTS

| 3,251,604 | A | * | 5/1966 | Better | B23B 31/305 279/4.02 |
| 3,388,917 | A | * | 6/1968 | Winnen | B23B 31/305 279/4.03 |
| 3,592,482 | A | * | 7/1971 | Better | B23B 31/305 279/4.06 |
| 4,533,287 | A | * | 8/1985 | Hagemeyer | B23B 31/305 273/148 B |
| 5,286,042 | A | * | 2/1994 | Laube | B23B 29/03421 279/133 |
| 8,083,445 | B2 | * | 12/2011 | Hyatt | B23B 31/02 408/58 |
| 9,289,831 | B2 | * | 3/2016 | Herud | B23B 31/12 |
| 2011/0175300 | A1 | * | 7/2011 | Schuffenhauer | B23B 31/305 279/4.06 |
| 2013/0001896 | A1 | * | 1/2013 | Herud | B23B 31/005 279/4.07 |
| 2014/0145406 | A1 | * | 5/2014 | Herud | B23B 31/1074 279/4.06 |

(Continued)

FOREIGN PATENT DOCUMENTS

| DE | 9305704 U1 | * | 7/1993 | ........ B23B 31/305 |
| DE | 4224872 A1 | * | 2/1994 | ........ B23B 31/305 |

(Continued)

*Primary Examiner* — Eric A Gates
(74) *Attorney, Agent, or Firm* — Matthew S. Bedsole

(57) ABSTRACT

Expansion chuck (1) with a base body (9) and an expansion sleeve (10) which is surrounded by a receptacle (6) for a tool, wherein the expansion sleeve (10) inside the base body (9) and at the front end (3) of the receptacle (6) is connected pressure-tight to the base body (9), thus forming a pressure chamber (11) between the base body (9) and the expansion sleeve (10), characterized in that the expansion sleeve (10) at the front end (3) of the base body (9) extends radially outward to an connecting section (34), where it is connected to the base body (9) in a pressure-tight manner.

17 Claims, 7 Drawing Sheets

(56) References Cited

U.S. PATENT DOCUMENTS

2015/0028548 A1* 1/2015 Haimer ............... B23B 31/005
279/4.06

FOREIGN PATENT DOCUMENTS

| | | | | |
|---|---|---|---|---|
| DE | 4416537 C1 | * | 11/1995 | ........... B23B 31/305 |
| DE | 29711184 U1 | * | 8/1997 | ........... B23B 31/305 |
| DE | 19926152 A1 | * | 12/2000 | ........... B23B 31/305 |
| DE | 10331769 A1 | * | 2/2005 | ........... B23B 31/305 |
| DE | 102004055855 A1 | * | 5/2006 | ......... B23B 31/1179 |
| DE | 102005043823 A1 | * | 3/2007 | ........... B23B 31/028 |
| DE | 102008039197 A1 | * | 2/2010 | ........... B23B 31/028 |
| DE | 102009049582 B3 | * | 5/2011 | ........... B23B 31/305 |
| DE | 202012104969 U1 | * | 2/2013 | ............. B23B 31/02 |
| DE | 102013108105 A1 | * | 1/2015 | ........... B23B 31/305 |
| DE | 202015105500 U1 | * | 12/2015 | ........... B23B 31/005 |
| DE | 102015122763 A1 | * | 8/2016 | ........... B23B 31/028 |
| EP | 0229748 A2 | * | 7/1987 | ........... B23B 31/305 |
| JP | 61090843 A | * | 5/1986 | ........... B23B 31/305 |
| JP | 2013220528 A | * | 10/2013 | ......... B23B 31/1178 |
| WO | WO 0160556 A1 | * | 8/2001 | ........... B23B 31/305 |

\* cited by examiner

EXPANSION CHUCK

RELATED APPLICATION DATA

The present application claims priority to German Patent Application Number 102014108539.6 filed Jun. 17, 2014 which is hereby incorporated by reference in its entirety.

FIELD

The invention concerns an expansion chuck with a base body and an expansion sleeve which is surrounded by a receptacle for a tool, wherein the expansion sleeve is connected pressure-tight to the base body and at the front end of the receptacle inside the base body, forming a pressure chamber between the base body and the expansion sleeve.

BACKGROUND

Such an expansion chuck is mainly intended to firmly clamp a tool, for instance a milling tool or a drill, inside the receptacle. The expansion chuck in turn is mounted on a machine tool at the end opposing the tool receptacle, so the tool can be used to process a work piece.

For clamping a tool in the receptacle, a closed volume formed between the expansion sleeve and the base body is pressurized, e.g., by pressing in oil, causing the expansion sleeve to pressurize inwards in the radial direction, i.e., towards the middle axis of the expansion chuck. This presses the expansion sleeve against the tool inside the receptacle, clamping it inside the receptacle.

To increase the maximum transferable torque between the expansion chuck and the tool, it is in principle desirable that the effective clamping section of the expansion sleeve, that is, the length of the area in which a high compression is generated between the inner surface of the expansion sleeve and the outer surface of the tool when pressurized, be as long as possible. At the same time, the expansion chuck should be as compact as possible in the axial direction. It is therefore desirable to make the clamping section as long as possible without increasing the length of the expansion chuck.

Another requirement for the expansion chuck is to clamp the tool in a manner that avoids any notch effect at the front end of the expansion chuck to the extent possible. Any such notch effect can lead to premature failure of the tool in the long term.

SUMMARY

The invention seeks to solve the problem of improving the known expansion chucks in a manner that results in a large effective clamping length and as low a notch effect on the clamped tool as possible.

To solve this problem, the invention provides for the expansion chuck described above to have its expansion sleeve at the front end of the base body extend radially outwards up to a connecting section, where it is connected to the base body in a pressure-tight manner. The invention is based on the underlying notion of arranging the connecting section of the expansion sleeve in the radial direction on the outside of the clamping section and to provide a type of transition segment between the clamping section and the connecting section, in which the expansion sleeve extends radially outward. The transition segment is characterized by having essentially the same wall thickness as the clamping section of the expansion sleeve. In other words, the connecting section of the expansion sleeve is displaced radially outward in relation to the clamping section, such that a clamped tool is supported only by the clamping section, but not the connecting section (more precisely, the inner edge of the connecting section). The transition segment may thus be considered part of the clamping section, as it slightly deforms under the pressure in the pressure chamber when clamping the tool and docks to the tool in an area immediately adjacent to the clamping section.

In contrast, in the prior art, the connecting section is an axial extension of the clamping section. This essentially leads to two problems, which are solved with the design described in the invention. On the one hand, the connecting section decreases the available length of the clamping section when it is an extension of the clamping section, since the connecting section "blocks" the front end of the expansion chuck, thus making it unavailable for clamping of the tool. On the other hand, the connecting section is relatively rigid, therefore posing the risk of a notch effect at the clamped tool. If, however, as provided by the invention, the connecting section is displaced radially outward, the clamping section can almost extend to the front part of the expansion chuck. The expansion sleeve is thus furthermore located at the front end of the expansion chuck, where its wall is thinner than it usually is in the connecting section and therefore more flexible than the connecting section. The notch effect is thereby avoided.

It is preferred that the expansion sleeve has a cylindrical clamping section and a transition segment extending radially outward starting from the latter, the wall thickness of which more or less corresponds to the wall thickness of the clamping section. The transition segment ensures the desired flexibility of the expansion sleeve at the front end, thereby decreasing the notch effect at the transition from the free to the clamped part of the tool.

It is preferably provided that the transition segment is realized as a bend, particularly with a bending radius greater than 1 mm and especially preferably with a bending radius between 1 and 2 mm. This avoids a sharp edge, which further decreases the notch effect.

According to an embodiment of the invention, the connecting section has a greater wall thickness than the clamping section. This can be advantageous with regard to resistance.

According to an embodiment of the invention, the expansion sleeve is designed to constitute a single piece with the base body. Such an expansion chuck can be manufactured with processes that are known for three-dimensional printing, wherein metal is used as raw material, which is assembled into a three-dimensional expansion chuck in thin layers.

According to an alternative embodiment, it is provided that the expansion sleeve is realized as a separate component that is connected to the base body in a pressure-tight manner, particularly by soldering. By means of such a two-part construction, the pressure chamber between the expansion sleeve and the base body can be achieved with little effort.

The expansion sleeve can either be produced through machining, for instance as a turned part, or be a component that has been plastically deformed, e.g. deep-drawn and/or extruded. For complicated contours, in particular near the connecting section, as well as for major changes in the wall thickness it is advantageous to produce the expansion sleeve through machining, while in the case of a generally constant wall thickness, it may be more cost-efficient to deep-draw or extrude the expansion sleeve.

According to an embodiment, it is provided that the end face of the base body is furnished with a groove or a ledge, so a soldering ring can be arranged therein/thereon during assembly. This increases the process reliability.

It is preferable that the outer clamping point of the expansion sleeve at which the latter can engage to a tool is located within the area of the pressure-tight connection to the base body or even outside of this area. This embodiment provides a maximum length for the effective clamping section, as it extends to the outer end of the expansion chuck.

According to an embodiment, it is provided that the expansion sleeve extends to one outer side of the base body. In other words, the expansion sleeve completely encompasses the front of the base body. The advantage of this embodiment is that a particularly large surface is available for soldering the expansion sleeve to the base body.

The expansion chuck according to the invention is particularly characterized in that the outer clamping point of the expansion sleeve at which the latter can engage to a tool is located less than 3 mm inside the front end of the expansion chuck, preferably less than 2 mm and particularly preferably less than 1.5 mm. This results in the length of the clamping section being comparably long, thus allowing also a comparably high torque to be transferred between the tool and the expansion chuck.

The invention is explained below using an embodiment that is illustrated in the accompanying drawings. In the drawings:

DETAILED DESCRIPTION

Figure 1:
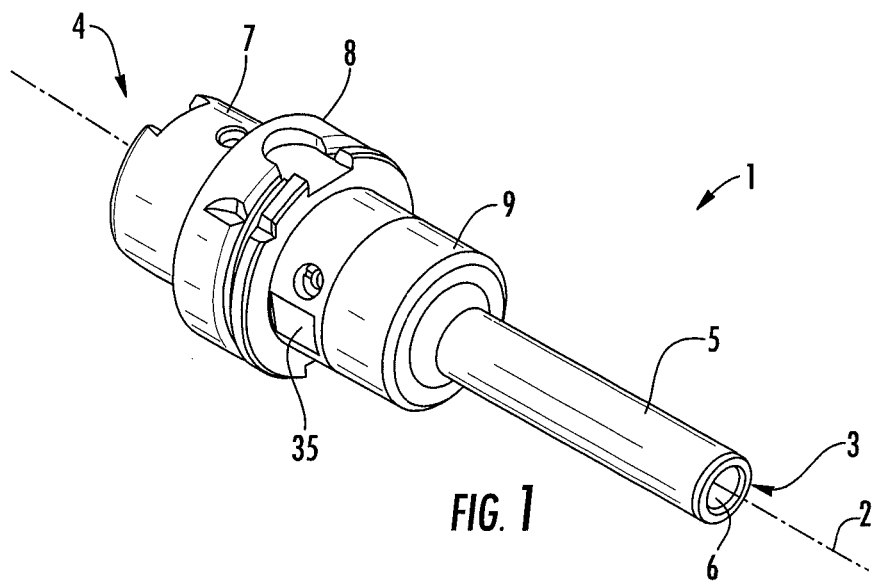
FIG. 1 in a perspective view schematically an expansion chuck known from prior art for clamping a tool.
Figure 2:
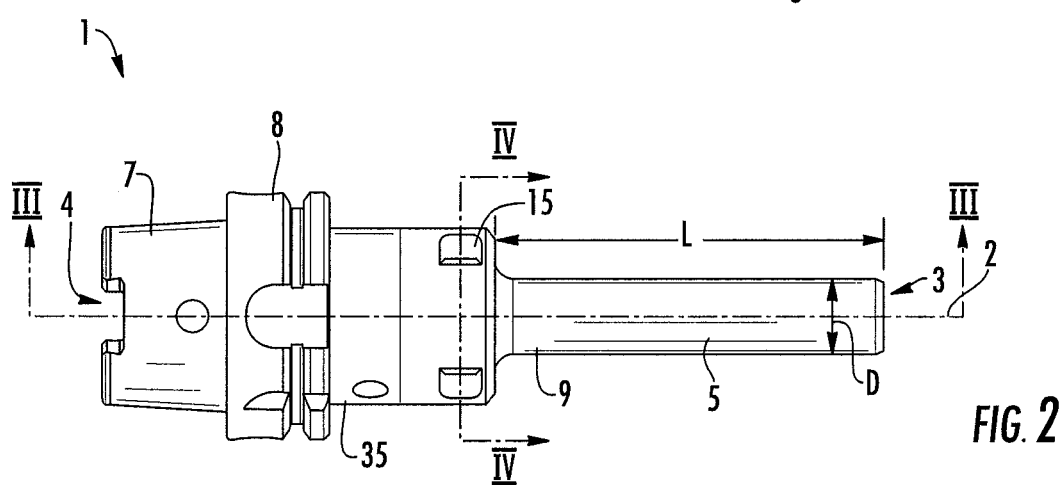
FIG. 2 a lateral view of the expansion chuck from FIG. 1.

FIGS. 1 to 4 show an expansion chuck 1 that serves to clamp a tool powered by a rotary drive (not shown), in particularly a drill or a milling cutter at the spindle drive of a machine tool (also not shown). The expansion chuck shown in these figures is generally known from prior art (for instance from WO 2005/097383), and the explanations only serve to explain the mode of operation of an expansion chuck. It is therefore not admissible to draw limiting conclusions for the embodiments according to the invention from the dimensions, application fields and special properties of the expansion chuck shown in FIGS. 1 to 4.

The expansion chuck 1 is essentially realized in a rotationally symmetrical manner with respect to an expansion chuck axis 2 forming the rotational axis and has, seen in the direction of said expansion chuck axis 2, a tool-side end 3 (hereinafter also called "front end") and a machine-side end 4. Near the tool-side end 3, the expansion chuck 1 is drawn out to a long and narrow neck area 5, which has a receptacle 6 for the tool at the free end.

The machine-side end 4 has a mounting cone 7 in the form of an HSK shank, for example, for connecting the expansion chuck 1 to the drive spindle.

The expansion chuck 1 here has a two-part base body which is formed from a base body part 8 at the machine-tool end and a base body part 9 at the tool end. Both parts 8, 9 are hand-soldered together and thus interconnected in a rigid and pressure-tight manner. It is also possible in principle to realize the base body of the expansion chuck as a single part or as more than two parts.

Figure 3:
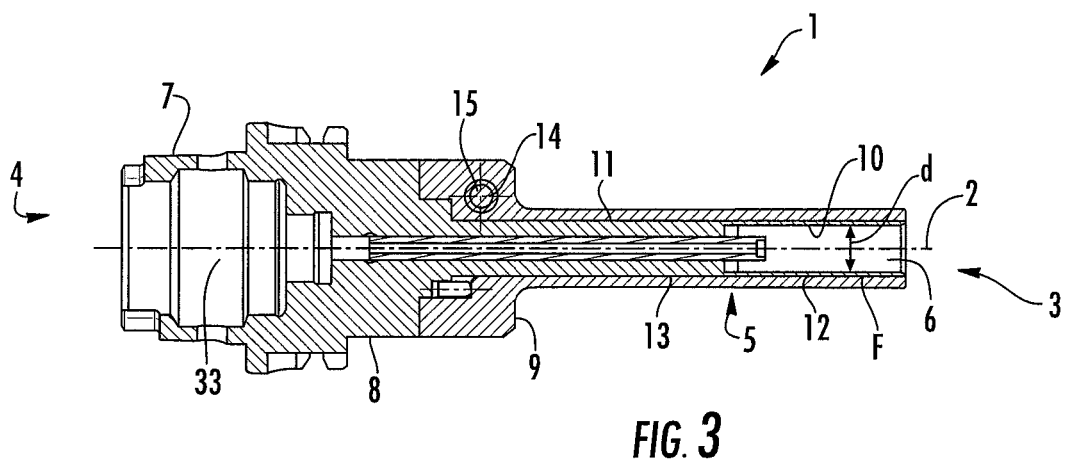
FIG. 3 a section along the plane from FIG. 2.

Near the receptacle 6 the base body 8 is a hollow cylinder and thin-walled. This thin-walled segment of the base body 8 is referred to as expansion sleeve 10. The expansion sleeve 10 is formed as one piece with the base body 8, but can also be formed from a separate piece. An annular gap 11 is formed between the inner wall of the base body 9 and the opposite outer wall of the expansion sleeve 10. This annular gap 11 only provides an extremely limited radial expansion R of preferably 0.1 mm (corresponding to about a tenth of the wall thickness of the expansion sleeve 10) and, due to resolution, can only be seen as such in the enlarged FIG. 4 and in particular in the further enlarged detailed representation A. In FIG. 3 the annular gap 11 is only marginally visible as a widened black line.

The annular gap 11 extends along the majority of the expansion sleeve 10 in the axial direction and forms a pressure chamber 12 near the receptacle 6, which holds a liquid pressure medium F, in particular an oil. The annular gap 11 segment extended beyond the pressure chamber 12 in the direction of the machine-tool end 4 provides a pressure conduction system 13, which fluidicly connects the pressure chamber 12 to a pressure-generating unit 14 that is axially displaced with regard to the pressure chamber 12, thus allowing a pressure transfer from the pressure-generating unit 14 into the pressure chamber 12.

Figure 4:
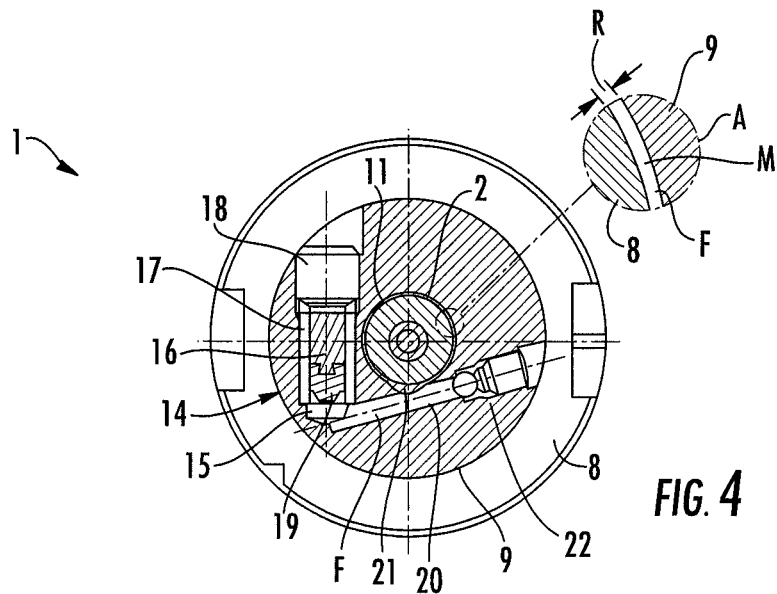
FIG. 4 a section along the plane IV-IV from FIG. 2.

The radial expansion R remains essentially the same over the entire length of the annular gap 11 in the unloaded state, so that the pressure chamber 12 merges into the pressure conduction system 13 without interruption. As can be seen particularly in FIG. 4, the pressure-generating unit 14 comprises a cylindrical bore 15, which contains a pressure piston 16. The pressure piston 16 is either adjustably guided directly inside the cylindrical bore 15 or, as shown in FIG. 4, in a sleeve 17 within the cylindrical bore 15. The pressure piston 16 must be actuated by means of a clamping screw 18.

The inner end of the pressure piston 16 bears a gasket 19 made from an elastic material, in particular an elastomer or rubber. The pressure-generating unit 14 further comprises a filling hole 20, which leads from the inner end of the cylindrical bore 15 in such an angled manner that it runs approximately tangentially to the annular gap 11. The filling hole 20 is thus fluidicly connected to both the cylindrical bore 15 and, via the annular gap 11, the annular gap 11. The filling hole 20 is closed to the outside world in a pressure-tight manner by means of a ball seal.

In their operational states, the cylindrical bore 15, the filling hole 20 and the annular gap 11 are completely filled with the pressure medium F.

For clamping a tool that has been placed in the receptacle 6, the clamping screw 18 and thus the pressure piston 16 can be adjusted in the cylindrical bore 15 by means of a screwdriver, thereby reducing the volume of the cylindrical bore 15 with the pressure medium F. A hydrostatic pressure of typically 1000 bar can thereby be applied to the pressure medium F. Via the annular gap 11, said pressure is transferred as pressure conduction system 13 into the area of the pressure chamber 12. Here, the hydrostatic pressure leads to a deformation of the thin-walled expansion sleeve 10, directed radially inward onto the expansion chuck axis 2, by means of which the tool is clamped in the receptacle 6. Owing to the comparably large wall thickness of the base body 9 adjacent to the pressure chamber 12 on the outside, the effect of the pressure does not lead to any significant deformation at the outer circumference of the expansion chuck 1.

To remove the tool from the expansion chuck 1, the pressure piston 16 is reset by a couple of turns of the clamping screw 18, thereby releasing the pressure medium F. The elastically deformed expansion sleeve 10 thus regains its original form, and the tool can be removed.

Below, various different embodiments of the expansion chuck according to the invention are described in FIGS. 5 to 13. In these descriptions, the same references numbers are used for the parts already known from FIGS. 1 to 4.

For all embodiments, the expansion sleeve 10 is realized as a separate part, which is connected to the respective base body 8 or 9 in a pressure-tight manner on its inside and to the base body 9 at the front end 3 in a pressure-tight manner. The pressure-tight connection is achieved through soldering. In principle, other types of connections are also suitable, provided they allow the contour of the expansion sleeve 10, in particular at the front end 3 of the expansion chuck to be retained. The expansion sleeve 10 can also be realized as one piece with the base body 9.

Figure 5:
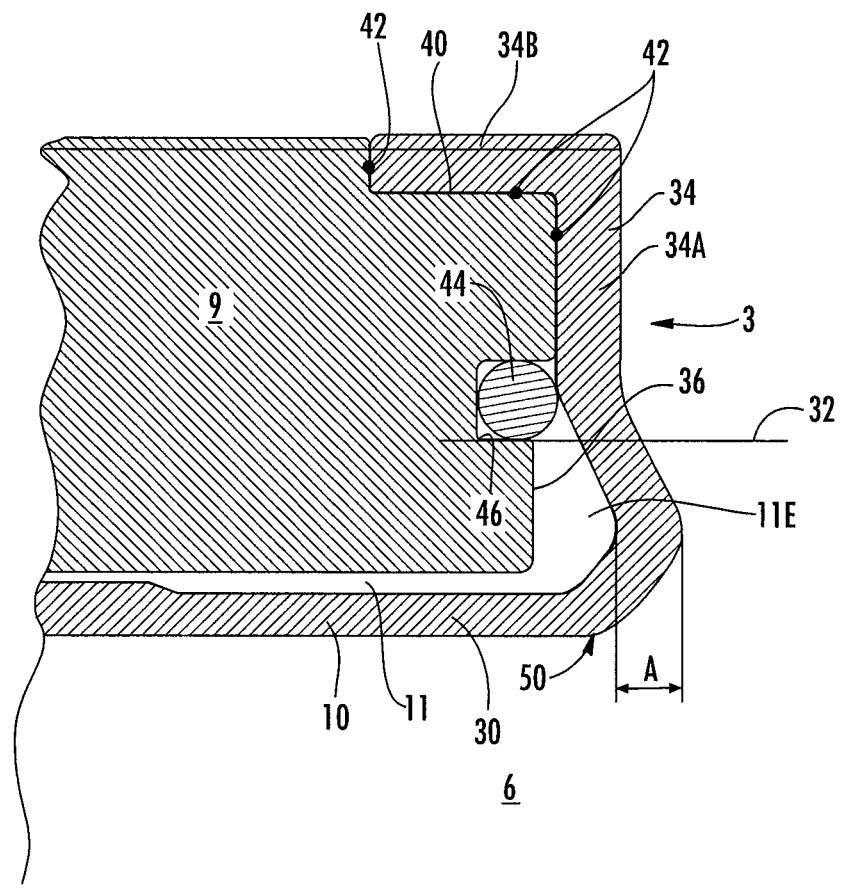
FIG. 5 in a sectioned partial view, the tool-side end of an expansion chuck according to a first embodiment of the invention.

In the case of the first embodiment shown in FIG. 5, the expansion sleeve 10 has an essentially constant wall thickness at the front end 3 of the expansion chuck. Starting from the cylindrical clamping section 30, the center axis of which coincides with the rotational axis of the expansion chuck, the expansion sleeve 10 extends radially outward at the front end 3 in a transition segment 32 and then merges into an connecting section 34.

The transition segment 32 extends over an angled section of slightly more than 90°, so that the connecting section 34 lies in the axial direction within the front most point of the transition segment 32. This results in the inside of the transition segment 32 lying at a distance from the end face 36 of the base body 9, thereby forming a pressure chamber expansion 11E. In other words, the pressure chamber has two parts, with one cylindrical segment 11 and one expansion segment extending radially outward.

The transition segment is realized as a bend, wherein the bending radius, measured on the inside of the expansion sleeve 10, lies within a size range of 1 to 1.5 mm.

Here, the connecting section 34 of the expansion sleeve 10 is realized at an angle, so that it is formed from a flange-like portion 34A adjacent to transition segment 32 and a collar-like area 34B adjacent thereto. The area 34B then integrates into a circumferential tier 40 at the front end 4 of the base body 9, so that the cylindrical outer surface of the area 34B represents constitutes an extension of the cylindrical outer surface of the base body 9 at the front end 3.

In the area of the connecting section 34, the expansion sleeve 10 is soldered to the base body 9, a total of three soldering surfaces 42 separated from each other being formed here, specifically on the area of the end face 36 lying radially to the outside, on the cylindrical section of the tier 40 as well as on an annular area, where the rear-facing end face of the area 34B is adjacent to the base body 9. The soldering material for the soldering points 42 is provided by a soldering ring 44, which is arranged in a groove 46 in the end face 36 of the base body 9. The groove 46 separates the end face 36 into an annular section lying radially on the inside, which constitutes a limit for the expansion 11E of the pressure chamber 11, as well as an annular section radially on the outside, in which the portion 34A of the interconnecting portion 34 is soldered to the base body 9.

When a tool is placed in the receptacle 6 and the pressure chamber 11 is pressurized, the clamping section of the expansion sleeve 10 is loaded radially inward. The clamping point furthest forward, which constitutes the outermost end of the contact between tool and expansion sleeve 10 in axial direction, is marked here with the reference number 50. It can be seen that the clamping point 50 lies only a very short distance A within or "behind" the front most end of the expansion chuck, wherein the distance A corresponds to the expansion sleeve 10 in this case. The wall thickness can lie within the range of, e.g., 1 to 1.5 mm, in particular 1.2 to 1.3 mm.

At the same time it can be seen that the clamping point A lies in the axial direction in front of the soldering surfaces 42, to which the expansion sleeve 10 is connected at the front end with the base body 9. With any given total length of the expansion chuck said expansion sleeve is thus optimally utilized such that the length of the clamping section is at a maximum.

The resulting notch effect on a clamped tool is thus minimized. On the one hand, a soft transition is created in the areas of the clamping point 50, since the transition segment 32 merges into the clamping section 30 in a slight curve. On the other hand, the expansion sleeve 10 near the clamping point 50 may yield elastically and radially outward, since it is not immediately supported by the base body 9 at this point, but is connected to the latter at the curved transition segment 32, which then has a spring effect.

Figure 6:
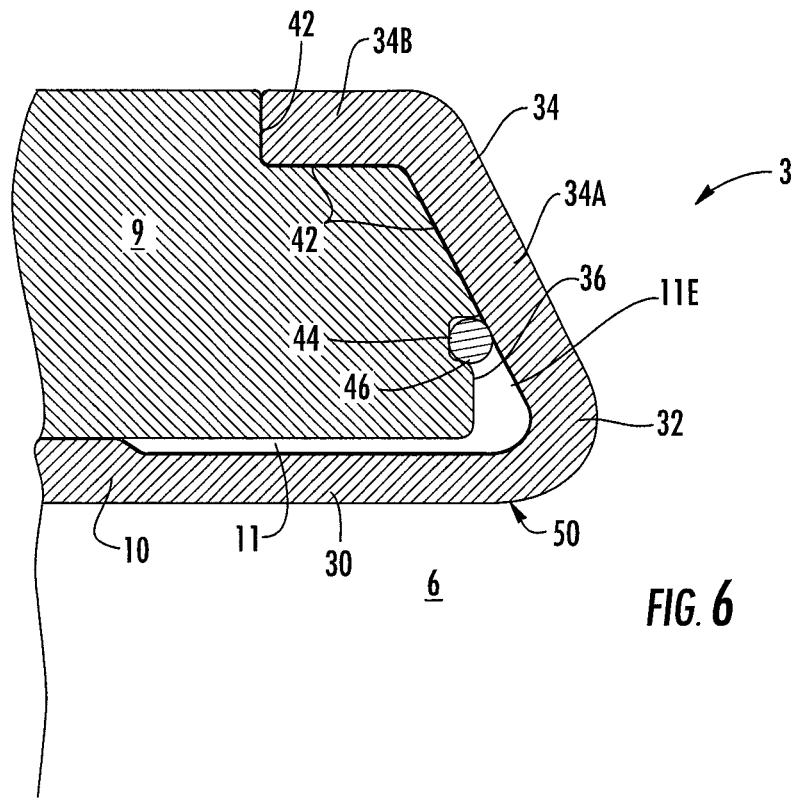
FIG. 6 in a sectioned partial view, the tool-side end of an expansion chuck according to a second embodiment of the invention.

FIG. 6 shows a second embodiment. The difference from the first embodiment is that the frontal portion 34A of the connecting section 34 does not extend in a plane perpendicular to the center axis of the expansion chuck, but is realized as an immediate extension of the transition segment 32 and therefore extends diagonally back- and outward as seen in cross section. In other words, the front of the expansion sleeve 10 forms a truncated cone surface. The advantage over the first embodiment is that the bending point between the transition segment 32 and the portion 34A of the connecting section 34 can be omitted.

Figure 7:
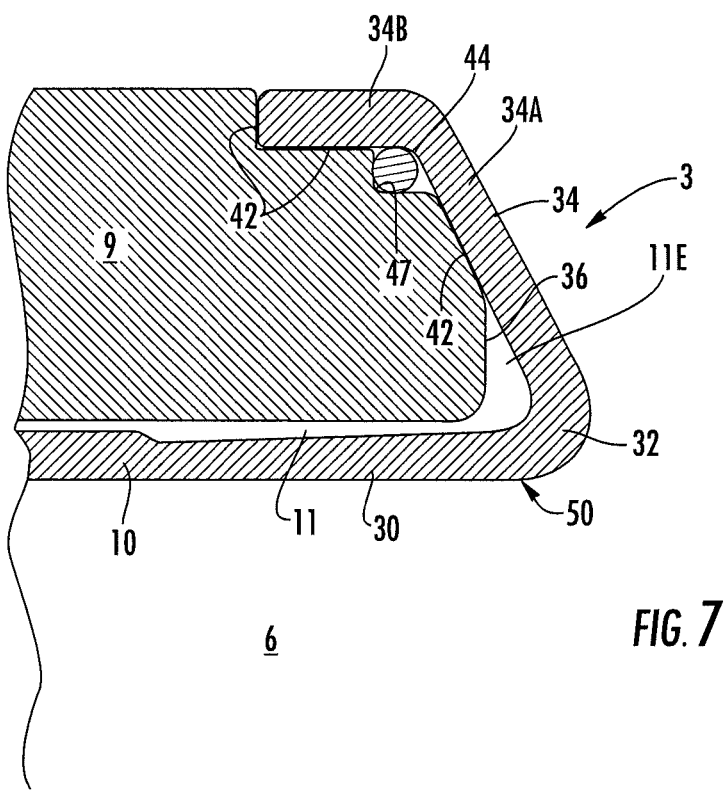
FIG. 7 in a sectioned partial view, the tool-side end of an expansion chuck according to a third embodiment of the invention.

FIG. 7 shows a third embodiment. This embodiment differs from the second in that the soldering ring 44 is not arranged in a groove 46 in the end face 36 of the base body 9, but in a circumferential ledge 47 at the transition between the end face 36 and the circumferential surface of the base body 9.

Figure 8:
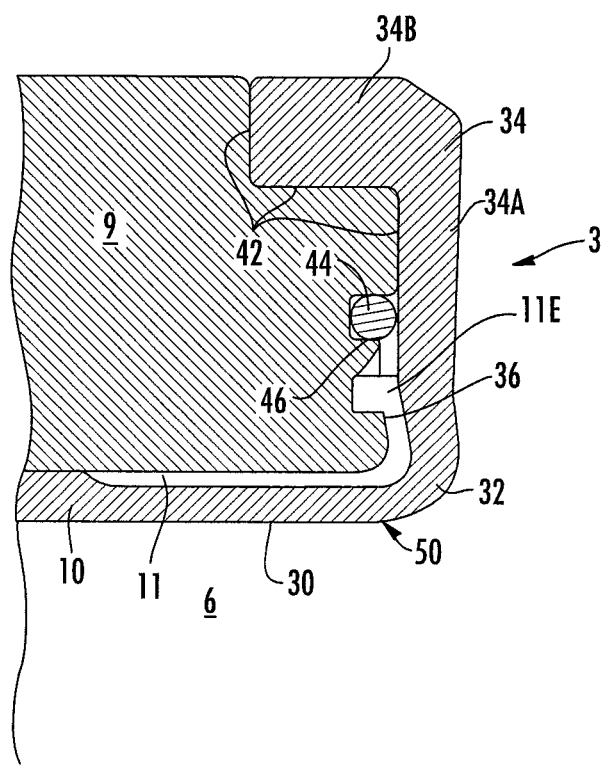
FIG. 8 in a sectioned partial view, the tool-side end of an expansion chuck according to a fourth embodiment of the invention.

FIG. 8 shows a fourth embodiment. The essential difference from the preceding embodiments is that the expansion sleeve 10 has differing wall thicknesses in different sections. While the wall thickness near the clamping section 30 and the transition segment 32 is essentially constant, the flange portion 34A has a greater wall thickness than the clamping section 30, while the sleeve area 34B in turn has a greater wall thickness. Except for this feature, the fourth embodiment is essentially the same as the first embodiment, wherein in the return from the transition segment 32 to the connecting section 34 is not as pronounced in the fourth embodiment as it is in the first embodiment. As a result, the clamping point 50 essentially lies at the level of the end face 36.

Figure 9:
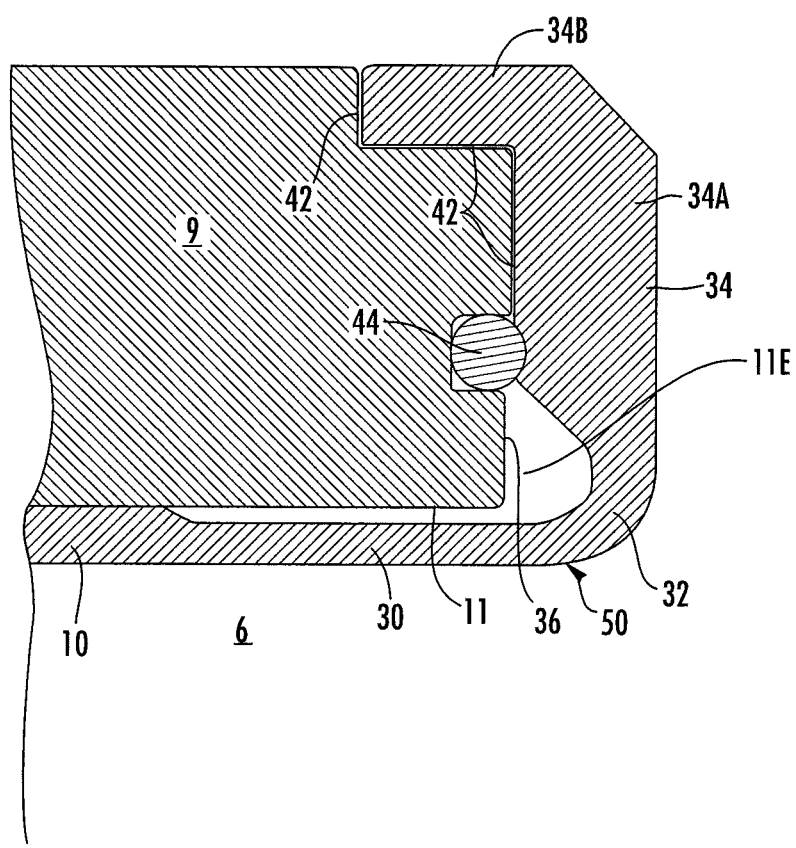
FIG. 9 in a sectioned partial view, the tool-side end of an expansion chuck according to a fifth embodiment of the invention.

FIG. 9 shows a fifth embodiment. The fifth embodiment is essentially identical to the fourth embodiment, but the relation of the wall thicknesses of the interconnection part 34 are reversed: the wall thickness of the sleeve area 34B is smaller than that of the flange portion 34A. The outer surface of the transition segment 32 thus merges with the front of the flange portion 34A, while the contour on the inside, when seen in cross-sectional view, extends back to the end face 36 of the base body 9, resulting in an altogether greater wall thickness of the flange portion 34A of the connecting section 34. As a consequence, the clamping point 50 is located axially in front of the end face 36 of the base body 9.

Figure 10:
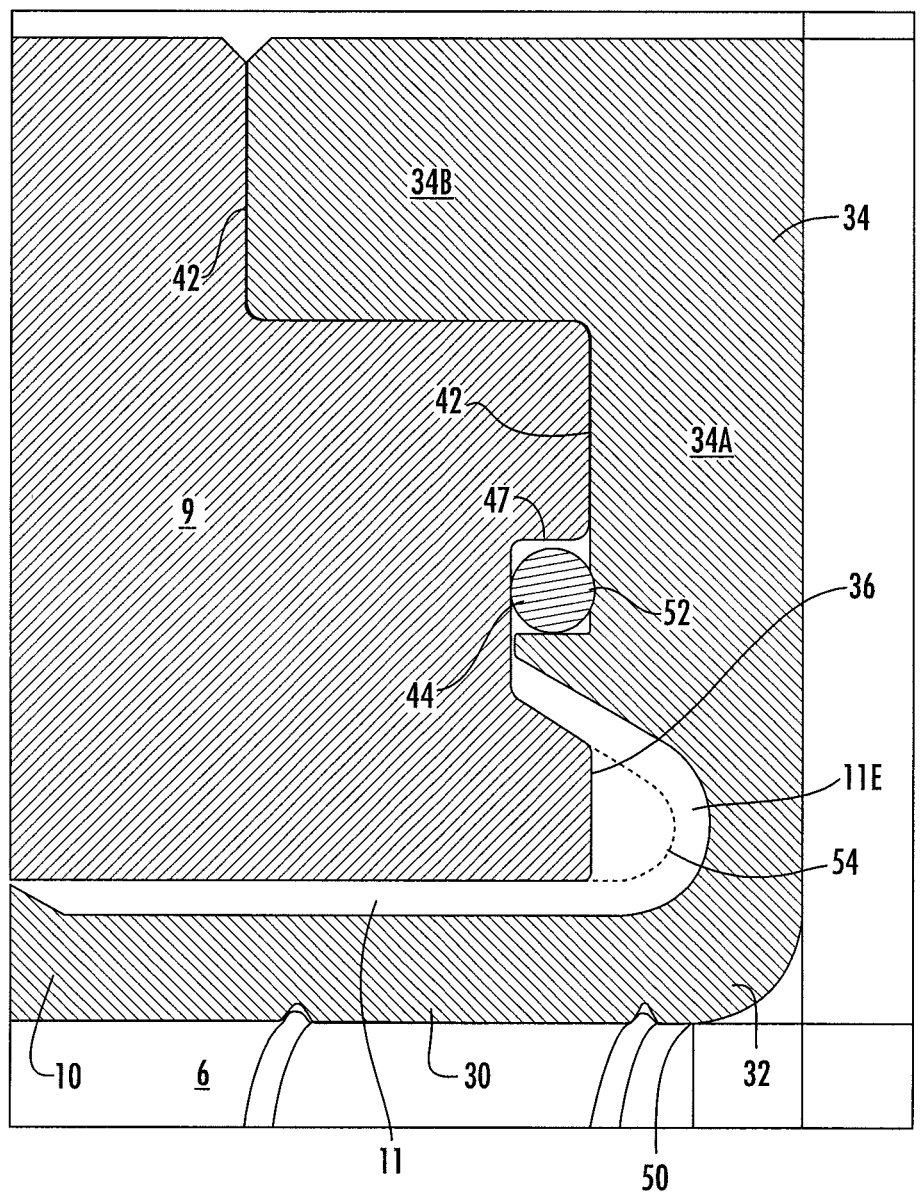
FIG. 10 in a sectioned partial view, the tool-side end of an expansion chuck according to a sixth embodiment of the invention.

FIG. 10 shows a sixth embodiment. This is essentially identical to the embodiment shown in FIG. 8, the soldering ring 44 of the seventh embodiment not being arranged in a groove 46 as is the case in the fifth embodiment, but on a ledge 46 in the end face 36 of the base body 9, which interacts with a ledge 52 on the inside of the expansion sleeve 10.

In FIG. 10, the dashed section represents an alternative contour of the end face 36 of the base body 9, in which the end face 36 has a bulging protrusion 54 in the cross section. In this variant, the expansion 11E of the pressure chamber 11 has a smaller volume.

Figure 11:
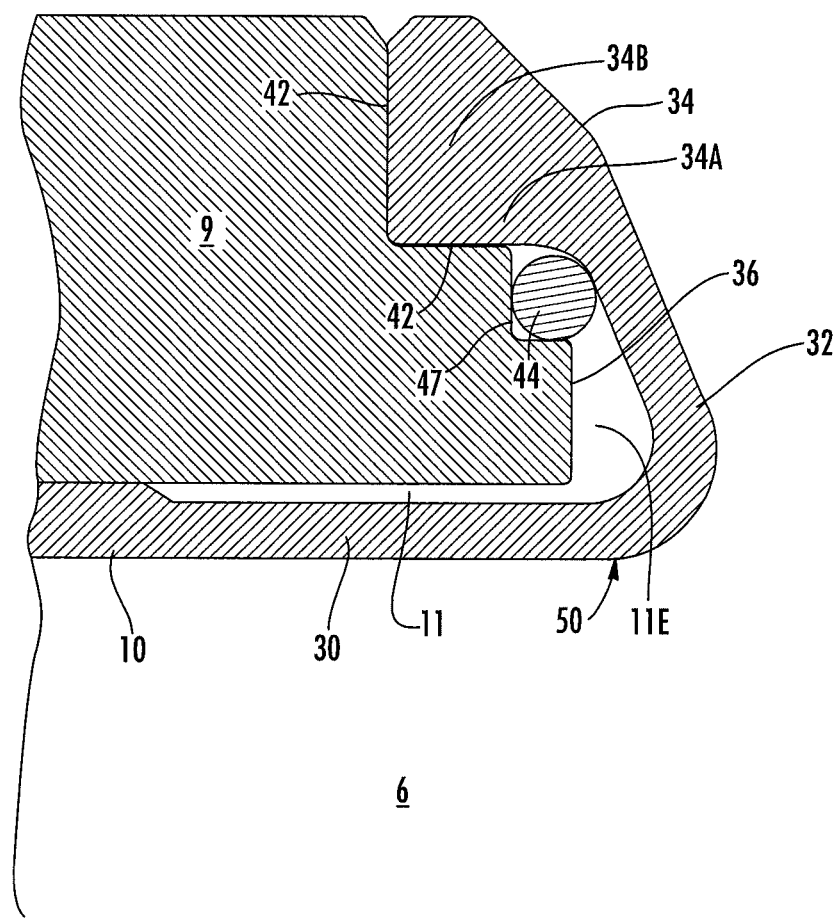
FIG. 11 in a sectioned partial view, the tool-side end of an expansion chuck according to a seventh embodiment of the invention.

FIG. 11 shows a seventh embodiment. The difference from the preceding embodiments is that the interconnecting part 34 is not realized with two portions 34A, 34B opposing each other in an angle of 90°, but rather the portions 34A, 34B merge into one another and are realized as a thickened, circumferential bulge at the radially outward end of the expansion sleeve 10. Another difference from the preceding embodiments is that as a result of the cross section of the connecting section 34, only two soldering surfaces 42 separated from each other are applied.

Since in the seventh embodiment, the transition segment 32 also extends over an angled area of more than 90°, the connecting section 34 again lies "behind" the transition segment 32 when seen in the axial direction. Accordingly, the clamping point 50 is located axially in front of the connecting section 34, and in particular in front of the soldering surfaces 42.

Figure 12:
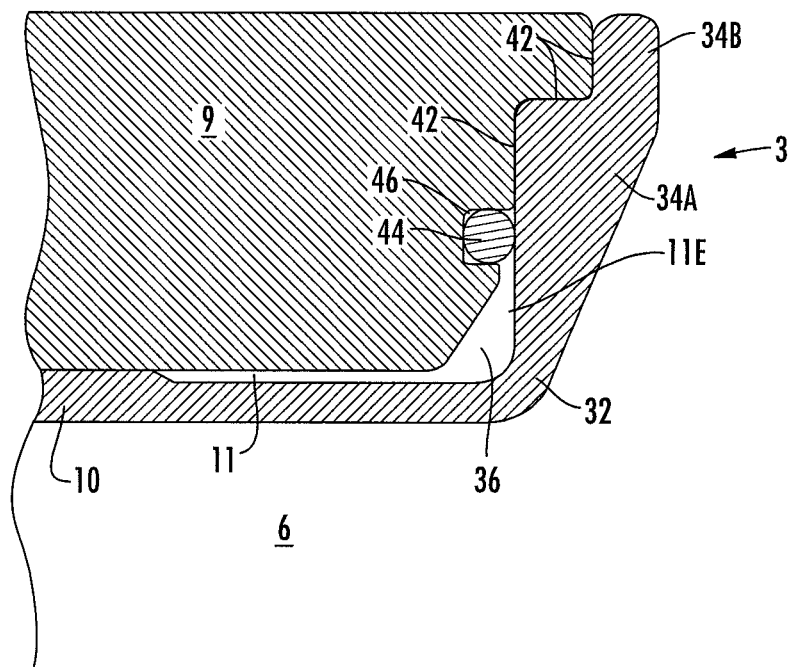
FIG. 12 in a sectioned partial view, the tool-side end of an expansion chuck according to an eighth embodiment of the invention.

FIG. 12 shows an eighth embodiment, in which the connecting section 34 is realized on its inside, when seen in cross-sectional view, as a radially outward extension of the transition segment 32. On the outside, the transition segment 32, when seen in cross-sectional view, also merges straight into the outer contour of the connecting section 34, wherein the end face of the portion 34A of the connecting section 34 defines a truncated cone surface, the tip of the cone lying within the front of the expansion chuck when seen in the axial direction. Near the area 34B of the connecting section, the end face extends on a plane that is perpendicular to the rotational axis of the expansion chuck. Thus, a large insertion cone is formed, which facilitates placing a tool into the receptacle 6.

Figure 13:
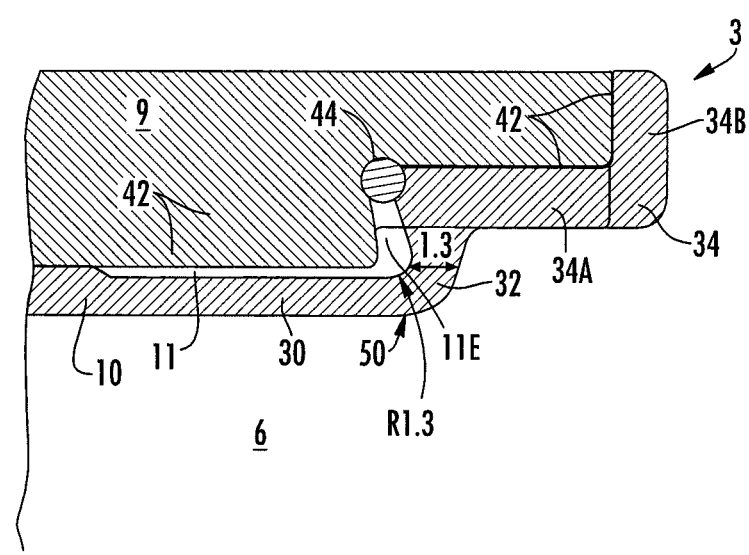
FIG. 13 in a sectioned partial view, the tool-side end of an expansion chuck according to a ninth embodiment of the invention.

FIG. 13 shows a ninth embodiment, which differs from the preceding embodiments in that the soldering surface 42 adjacent to the pressure chamber 11 or, more precisely, the expansion 11E of the pressure chamber 11 constitutes an extension of the pressure chamber 11, when seen the axial direction and in cross-sectional view, i.e., it extends in the axial direction from the pressure chamber to the end face at the front end 3 of the expansion chuck. However, the connecting section 34 is again displaced outward in the axial direction against the clamping section 30 of the expansion sleeve 10, so that the clamping section 30 first merges into the curved transition segment 32, which then connects to the connecting section. This embodiment thus also ensures that the clamping section 30 near the clamping point 50 is not immediately supported by the base body 9, but can yield elastically in order to reduce the notch effect.

The invention claimed is:

1. An expansion chuck comprising a base body; and an expansion sleeve surrounding a receptacle for a tool, wherein the expansion sleeve is inside the base body and is connected pressure-tight at a front end of the receptacle, thus forming a pressure chamber between the base body and the expansion sleeve, wherein the expansion sleeve at a front end of the base body extends radially outward to a connecting section, where it is connected to the base body in a pressure-tight manner; and wherein an annular gap extends beyond the pressure chamber in a direction of the front end of the base body.

2. The expansion chuck as claimed in claim 1, wherein the expansion sleeve has a cylindrical clamping section and a transition segment extending radially outward starting from the latter, and wherein a wall thickness of the transition segment roughly corresponds to a wall thickness of the clamping section.

3. The expansion chuck as claimed in claim 2, wherein the transition segment is realized as a bend.

4. The expansion chuck as claimed in claim 3, wherein a radius of the bend is greater than 1 mm.

5. The expansion chuck as claimed in claim 4, wherein the radius of the bend is between 1 and 2 mm.

6. The expansion chuck as claimed in claim 2, wherein the transition segment has a greater wall thickness than the clamping section.

7. The expansion chuck as claimed in claim 1, wherein the expansion sleeve is formed as one piece with the base body.

8. The expansion chuck as claimed in claim 1, wherein the expansion sleeve is realized as a separate component that is connected to the base body in a pressure-tight manner.

9. The expansion chuck as claimed in claim 8, wherein the expansion sleeve is a machined component.

10. The expansion chuck as claimed in claim 8, wherein the expansion sleeve is a plastically deformed component.

11. The expansion chuck as claimed in claim 8, wherein an end face of the base body is furnished with a groove or a ledge, so that a soldering ring can be arranged during assembly.

12. The expansion chuck of claim 8, wherein the expansion sleeve is connected to the base body by soldering.

13. The expansion chuck as claimed in claim 1, wherein an outer clamping point of the expansion sleeve, at which the latter can engage with a tool, is located within the area of the pressure-tight connection to the base body or even outside of this area.

14. The expansion chuck as claimed in claim 1, wherein the expansion sleeve extends up to an outer side of the base body.

15. The expansion chuck as claimed in claim 1, wherein an outer clamping point of the expansion sleeve, at which the latter can engage with a tool, is located inside the expansion chuck and less than 3 mm from the front end of the expansion chuck.

16. The expansion chuck of claim 15, wherein the outer clamping point is located inside the expansion chuck and is less than 2 mm from the front end of the expansion chuck.

17. The expansion chuck of claim 15, wherein the outer clamping point is located inside the expansion chuck and is less than 1.5 mm from the front end of the expansion chuck.

* * * * *